(12) United States Patent
Legnedahl et al.

(10) Patent No.: US 11,332,017 B2
(45) Date of Patent: May 17, 2022

(54) METHOD AND A DEVICE FOR CONTROLLING THE OPERATION OF AN ENERGY STORAGE SYSTEM IN A VEHICLE

(71) Applicant: VOLVO TRUCK CORPORATION, Gothenburg (SE)

(72) Inventors: Niklas Legnedahl, Onsala (SE); Hanna Bryngelsson, Gothenburg (SE); Simon Brunet, Landvetter (SE); Tobias Smidebrant, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 110 days.

(21) Appl. No.: 16/309,514

(22) PCT Filed: Jun. 14, 2016

(86) PCT No.: PCT/EP2016/063619
§ 371 (c)(1),
(2) Date: Dec. 13, 2018

(87) PCT Pub. No.: WO2017/215738
PCT Pub. Date: Dec. 21, 2017

(65) Prior Publication Data
US 2019/0160948 A1    May 30, 2019

(51) Int. Cl.
*B60L 3/00* (2019.01)
*B60L 58/10* (2019.01)
(Continued)

(52) U.S. Cl.
CPC ............. *B60L 3/0046* (2013.01); *B60L 58/10* (2019.02); *B60L 58/13* (2019.02);
(Continued)

(58) Field of Classification Search
CPC ........ B60L 3/0046; B60L 58/10; B60L 58/13; B60L 2240/80; B60L 2260/162;
(Continued)

(56) References Cited

U.S. PATENT DOCUMENTS

| 2007/0247106 A1 | 10/2007 | Kawahara et al. |
| 2008/0211457 A1 | 9/2008 | Rudorff et al. |
| 2010/0109437 A1* | 5/2010 | Fattic ............ B60L 58/21 307/47 |
| 2010/0305792 A1* | 12/2010 | Wilk ............. B60L 50/61 701/22 |
| 2012/0083948 A1* | 4/2012 | Tate, Jr. ........ B60L 58/12 701/22 |

(Continued)

FOREIGN PATENT DOCUMENTS

| CN | 102442220 A | 5/2012 |
| CN | 103326451 A | 9/2013 |

(Continued)

OTHER PUBLICATIONS

China Office Action dated Oct. 11, 2021 in corresponding China Patent Application No. 201680086663.7, 6 pages.

*Primary Examiner* — Rami Khatib
*Assistant Examiner* — Gabriel J Lambert
(74) *Attorney, Agent, or Firm* — Venable LLP; Jeffri A. Kaminski

(57) ABSTRACT

The invention relates to a method for controlling the operation of an energy storage system (10) in a vehicle (30), preferably an electric or hybrid electric vehicle, said energy storage system (10) comprising at least two battery packs (12) connected in parallel, said energy storage system (10) being adapted to provide at least a nominal power functionality for propulsion of said vehicle (30) using an allowed operating extent of all of said battery packs (12) of said energy storage system (10), said allowed operating extent
(Continued)

being a nominal working range of said battery packs (12); said method comprising disconnecting at least one battery pack (12); and setting said allowed operating extent for said remaining connected and active battery pack(s) (12) to an increased working range so as to enable said energy storage system (10) to provide said nominal power functionality to said vehicle (30), the method further comprising monitoring at least one accumulated parameter indicative of the operation of said energy storage system (10) from the time of disconnection of said at least one battery pack (12), and when said accumulated parameter reaches a threshold value, setting said allowed operating extent for said remaining battery pack(s) (12) to a decreased working range. The invention also relates to a control unit for controlling the operation of an energy storage system (10).

15 Claims, 3 Drawing Sheets

(51) Int. Cl.
    *B60L 58/13*     (2019.01)
    *B60L 58/24*     (2019.01)

(52) U.S. Cl.
    CPC ..... *B60L 2240/80* (2013.01); *B60L 2260/162* (2013.01); *Y02T 10/70* (2013.01)

(58) Field of Classification Search
    CPC .... B60L 58/24; Y02T 10/7005; Y02T 10/705; Y02T 10/7044
    See application file for complete search history.

(56) References Cited

U.S. PATENT DOCUMENTS

| | | | |
|---|---|---|---|
| 2012/0313560 A1* | 12/2012 | Hambitzer | B60L 58/10 318/139 |
| 2013/0113495 A1* | 5/2013 | Kim | H01M 10/425 324/434 |
| 2014/0022681 A1* | 1/2014 | Mitsutani | B60L 15/007 361/86 |
| 2015/0239366 A1* | 8/2015 | Jestin | H02J 7/0047 307/10.1 |
| 2015/0286199 A1* | 10/2015 | Fushiki | G05B 19/042 700/295 |
| 2016/0207415 A1* | 7/2016 | Sato | B60L 58/22 |
| 2016/0254686 A1* | 9/2016 | Steil | B60L 58/20 320/112 |
| 2017/0120770 A1* | 5/2017 | Huynh | H02J 7/0063 |
| 2017/0238258 A1* | 8/2017 | Ramalho de Oliveira | H04W 52/0261 455/574 |
| 2019/0160948 A1* | 5/2019 | Legnedahl | B60L 58/10 |

FOREIGN PATENT DOCUMENTS

| | | |
|---|---|---|
| CN | 103444043 A | 12/2013 |
| CN | 104348193 A | 2/2015 |
| CN | 104619547 A | 5/2015 |
| JP | 2013074707 A | 4/2013 |

* cited by examiner

METHOD AND A DEVICE FOR CONTROLLING THE OPERATION OF AN ENERGY STORAGE SYSTEM IN A VEHICLE

TECHNICAL FIELD

The invention relates to a method for controlling the operation of an energy storage system in a vehicle, preferably an electric or hybrid electric vehicle. The invention also relates to a control unit for controlling the operation of an energy storage system in a vehicle.

The invention is applicable on vehicles comprising an energy storage system for propulsion of the vehicle. As such, the vehicle may be an electric or a hybrid electric vehicle. Although the invention will be described with respect to a bus in the below detailed description of the invention, the invention is not restricted to this particular vehicle, but may also be used in other vehicles such as cars, lorries or trucks.

BACKGROUND

In vehicles, energy storage systems in the form of batteries are used for various purposes. In particular in electric or hybrid electric vehicles, the energy storage system may be used to provide power supply for propulsion of the vehicle in an electric operation mode, or at least in a partially electric operation mode.

The present disclosure relates to energy storage systems of the type which comprises at least two battery packs connected in parallel. During nominal use of the energy storage system, all battery packs contribute to providing at least a nominal power functionality for propulsion of the vehicle. The energy system is adapted to provide said nominal power functionality using a nominal allowed working range of the battery packs. Such a nominal allowed working range is set depending on the characteristics of the battery packs in question, and with the aim of providing proper functioning of the battery packs over an intended lifetime of the energy system and/or the battery packs.

For example, when using Lithium ion batteries in the battery packs, the nominal work range could be set so as to use between 20 and 60% as expressed in State of Charge (SOC) of the battery packs. It is known that if using a wider work range, the battery packs risk prematurely aging.

However, if an abnormality occurs in one of the battery packs connected in parallel in the energy storage system, rendering the abnormal battery pack unable to reach its nominal performance, the remaining and active battery packs may not be able to provide the nominal power functionality to the vehicle while using the nominal working range.

To handle this situation, various methods have been proposed.

US2007/0247106 describes a system wherein, if an abnormality occurs in one of the battery packs, the abnormal battery pack is disconnected, and the remaining sound battery packs are led to an increased high state of charge (SOC).

US 2015/0239366 describes a system wherein, if an abnormality occurs in one of the battery packs, the abnormal battery pack is disconnected, and the remaining sound battery packs are restricted to provide a reduced maximum power to the vehicle.

The prior methods have the disadvantage of either resulting in overuse of the remaining sound battery packs, which risks deteriorating the sound battery packs, or resulting in a restriction of the power functionality provided to the vehicle, which means that the function of the vehicle is impaired.

SUMMARY

An object of the invention is to provide a method and device for controlling the operation of an energy storage system in a vehicle, preferably an electric or hybrid electric vehicle, which enables disconnecting at least one battery pack from the energy storage system, while providing an improvement or an alternative in view of the prior methods.

According to a first aspect of the invention, the object is achieved by a method according to claim 1.

According to said first aspect, there is provided a method for controlling the operation of an energy storage system in a vehicle, preferably an electric or hybrid electric vehicle, the energy storage system comprising at least two battery packs connected in parallel. The energy storage system is adapted to provide at least a nominal power functionality for propulsion of said vehicle using an allowed operating extent of all of the battery packs, said allowed operating extent being a nominal working range of the battery packs. The method comprises: disconnecting at least one battery pack and setting the allowed operating extent for the remaining, connected and active, battery pack(s) to an increased working range so as to enable the energy storage system to provide said nominal power functionality to the vehicle. The method further comprises monitoring at least one accumulated parameter indicative of the operation of the energy storage system from the time of disconnection of said at least one battery pack, and, when said accumulated parameter reaches a threshold value, setting the allowed operating extent for the remaining battery pack(s) to a decreased working range.

Generally, for an energy storage system as described in the above, the task of the system is to provide a nominal power functionality to the vehicle. The nominal power functionality represents a desired capacity of the energy storage system, necessary for the desired function of the vehicle, and will be described in more detail in the below.

To optimise the energy storage system, it is desired to use battery packs providing sufficient energy storage and power output capacity for providing said nominal power functionality to the vehicle, but it is also generally desired not to over dimension the energy storage system by providing superfluous battery packs.

A battery pack is generally designed to be used within an allowed operating extent, which is optimised to ensure a sufficient working life of the battery pack. To this end, the allowed operating extent may e.g. set limits for the maximum loading and depletion of the battery pack, the discharge current, the discharge power, etc.

Accordingly, the size of an energy storage system may be optimised for a determined nominal power functionality such that, when using a nominal working range of all of the battery packs of the energy storage system, this is sufficient to provide said nominal power functionality. However, if using a nominal working range of less than all of the battery packs, for example if at least one battery pack is disconnected, the energy system is unable to provide said nominal power functionality.

In an energy storage system, it may be desired to disconnect at least one out of the battery packs of the energy storage system for various reasons. One such reason is if the battery pack does not function adequately, which is defined as a fault in the battery pack.

Optionally, the method comprises the step of determining that at least one battery pack is faulty before disconnecting said battery pack from the remaining battery pack(s).

To determine faults in battery packs, several methods have been proposed and are known to a person skilled in the art. Advantageously, the energy storage system may comprise measuring means for measuring properties of the battery packs, and/or disconnection means for enabling disconnection of a battery pack from the remainder of the battery packs. Such measuring means and/or disconnection means may advantageously communicate with a control unit.

According to the method proposed herein, once a battery pack is disconnected, the allowed operating extent of the remaining, connected and active, battery pack(s) is reset to an increased working range.

An increased working range is a working range allowing for increased use of the energy stored in the battery pack, as compared to the nominal working range. To this end the working range may be increased in different manners. For example, the increased working range may be broader than the nominal working range, such that the maximum limit for use of the energy stored in the battery pack is increased and/or the minimum limit for use of the energy stored in the battery pack is decreased. Optionally, the increased working range may be increased in that the range is translated so as to encompass new values, although the width of the range is not increased. In either case, the working range should be increased such that it allows for increased output of power from the battery pack.

Accordingly, the increased working range allows for provision of the nominal power functionality from the energy storage system although at least one battery pack thereof has been disconnected.

Allowing the remaining battery packs to work within an increased working range compared to the nominal working range may per se risk deteriorating the battery packs, reducing the working life thereof. However, to reduce the risk of damaging the battery packs, the increased working range will be allowed (i.e. will form the allowed operating extent of the battery packs) only for a restricted interval, namely until the accumulated parameter reaches a threshold value. Once the threshold value is reached, the allowed operating extent is set to a decreased working range. By allowing for overuse of the remaining battery packs during the restricted interval only, severe deterioration of the battery packs' lifetime may be avoided.

A decreased working range is a working range allowing only for decreased use of the energy stored in the battery pack, at least as compared to the increased working range. To this end the working range may be decreased in different manners. For example, the decreased working range may be narrower than the increased working range, such that the maximum limit for use of the energy stored in the battery pack is decreased and/or the minimum limit for use of the energy stored in the battery pack is increased. Optionally, the decreased working range may be decreased in that the range is translated so as to encompass new values, although the width of the range is not decreased. In either case, the decreased working range should be decreased such that it restricts the output of power from the battery pack as compared to the increased working range.

Optionally, the decreased working range may be a working range allowing only for decreased use of the energy stored in the battery pack, as compared also to the nominal working range. The explanation of the "decreased working range" as compared to the increased working range in the above paragraph is in this case similarly applicable to the "decreased working range" as compared to the nominal working range.

As such, the proposed method aims to balance the need for providing the nominal power functionality to the vehicle for continued normal operation thereof, even though at least one battery pack is disconnected, with the need to protect the remaining, sound battery packs from decline.

Practically, this means that a vehicle may continue its normal operation for a certain interval after the disconnection of one of the battery packs from the energy storage system. This interval may be used to drive the vehicle to a service station, or, if desired, to complete a working schedule, e.g. for a bus or a working vehicle.

Optionally, the method may comprise monitoring at least a first and a second accumulated parameter indicative of the operation of the energy storage system, and, when said first accumulated parameter reaches a first threshold value, or said second accumulated parameter reaches a second threshold value, setting the allowed operating extent for the remaining battery pack(s) to the decreased working range.

The first and/or second threshold value(s) may be determined considering the characteristics of the energy storage system. The first and/or second threshold value(s) may be predetermined or may be calculated using prevalent conditions as in-parameters.

Moreover, the threshold value(s) may be adapted depending on the number of battery packs being disconnected, e.g. a first threshold value may be applicable if one battery pack is disconnected, a second threshold value if two battery packs are disconnected, etc.

Optionally, the accumulated parameter may be indicative of the time passed after disconnection of the at least one battery pack, the electrical work performed by the energy storage system after disconnection of the at least one battery pack and/or the energy throughput of the energy storage system after disconnection of the at least one battery pack.

Optionally, the accumulated parameter is indicative of the energy throughput of the energy storage system after disconnection of the at least one battery pack, and the threshold value is greater than 200 kWh, preferably greater than 500 kWh, and/or the threshold value is less than 10 000 kWh, more preferred less than 7000 kWh, most preferred less than 5000 kWh.

For example, a threshold value using the energy throughput or the electrical work as accumulated parameter may be set so as to result in the provision of said nominal power functionality for an estimated time interval of at least 4 h, preferably at least 8 h, more preferred at least 10 h. Such a time period may also be less than 36 h, preferably less than 24 h, most preferred less than 15 h.

Optionally, the accumulated parameter may be indicative of the time passed after disconnection of the at least one battery pack, and the threshold value is at least 4 h, preferably at least 8 h, more preferred at least 10 h and/or less than 36 h, preferably less than 24 h, most preferred less than 15 h.

Optionally, the allowed operating extent (i.e. the different working ranges) of the battery packs may be indicative of at least one of the state of charge, the charging current, the discharging current, and the power output of the battery pack(s).

As a non-limiting example, the nominal working range may be set using e.g. the discharging current as a limiting parameter. If so, it may be preferred that the discharging current is used as a limiting parameter throughout the method, i.e. that the increased working range is achieved by increasing the upper limit for the discharging current from a nominal discharging current value, and that the subsequent decreased working range is achieved by decreasing the upper limit for the discharging current.

The above is an example where the same parameter is used for setting the nominal working range, the increased working range, and the decreased working range.

However, it is alternatively conceivable to utilise different parameters for setting the nominal allowed working range, for increasing the allowed working range, and/or for decreasing the allowed working range throughout the method.

Optionally, the working range may be individually controlled for each one of the battery packs.

Optionally, the working range may be controlled for a group comprising at least two out of the battery packs, or for the group comprising all of the battery packs.

Optionally, the method comprises, when said threshold value is reached, setting the allowed operating extent of the remaining battery pack(s) to a decreased working range so as to no longer enable provision of said nominal power functionality from the energy storage unit to the vehicle.

For example, the allowed operating extent of the remaining battery pack(s) may be set to a decreased working range so as to provide only a restricted power functionality to the vehicle, enabling for example driving a certain distance at a limited speed, e.g. to allow for moving the vehicle for emergency reasons. Alternatively, the decreased working range of the remaining battery pack(s) may be such that the energy storage system provides no or very restricted power functionality to the vehicle, whereby no further driving of the vehicle in an electric mode is possible.

Optionally, the nominal power functionality may correspond to a set or sets of function parameters to be provided by said energy storage system, said function parameters comprising electrical work output and/or energy throughput, and/or duration.

The sets of function parameters may be determined according to the type of vehicle, and correspond to the function parameters necessary to enable a certain driving behaviour in defined driving situations. A non-limiting example of a driving situation could be that the vehicle shall be capable of driving up a slope of a pre-determined inclination at a pre-determined speed.

When setting the threshold value for the accumulated parameter, the interest of keeping the batteries in a good condition may be balanced with the need for acquiring a certain interval (e.g. in time or distance) during which the nominal power functionality for propulsion of the vehicle may still be achieved.

This interval may suitably be adapted e.g. to drive the vehicle to a service station for replacement of the faulty battery.

Alternatively or in addition to the above, the sets of function parameters may be determined according to an intended use schedule of the vehicle. For example, sets of function parameters may be achieved by defining the parameters necessary to enable function of the vehicle in particular driving situations occurring during said intended use schedule. For example, a bus travelling a certain bus route shall be capable of driving up the steepest inclination of the bus route at a pre-determined speed, or shall be capable of starting in an uphill slope at a bus stop occurring along said route.

An intended use schedule of a vehicle may define a time and/or a distance and/or a route which the vehicle is intended to travel.

Accordingly, when setting the threshold value for the accumulated parameter, the interest of keeping the batteries in a good condition may be balanced with the need for acquiring a certain scheduled interval (e.g. in time or distance) during which the intended power functionality for propulsion of the vehicle may still be achieved.

For example, the threshold may be set so as to enable a bus to finish its intended route, or to finish a working day, with continued provision of the nominal power functionality, that is without impairing the function of the vehicle.

Optionally, a scheduled interval may be at least 4 h, preferably at least 8 h, more preferred at least 10 h. Such a time period may also be less than 36 h, preferably less than 24 h, most preferred less than 15 h.

Optionally, instead of considering the interval to be ensured when setting the threshold value for the accumulated parameter in terms of time, the need for continued provision of the nominal power functionality could be considered in terms of distance and/or number of working operations, where a working operation may be e.g. a stop and a start of the vehicle.

Once the working range of the remaining battery packs is decreased, the vehicle may no longer be provided with the nominal power functionality. Still, some power functionality may be provided to the vehicle, for example enabling driving at relatively slow speed.

In a second aspect, the object is achieved by a computer program in accordance with appended claim 11, comprising program code means for performing the steps of the method as described hereinabove when said program is run on a computer.

In a third aspect, the object is achieved by a computer readable medium in accordance with appended claim 12, carrying a computer program comprising program code means for performing the steps of the method as described hereinabove when said program product is run on a computer.

In a fourth aspect, the object is achieved by a control unit in accordance with appended claim 13.

The control unit may be a control unit for controlling the operation of an energy storage system in a vehicle, preferably an electric or hybrid electric vehicle, the energy storage system comprising at least two battery packs connected in parallel, the energy storage system being adapted to provide at least a nominal power functionality for propulsion of the vehicle using an allowed operating extent of all of the battery packs of the energy storage system, the allowed operating extent being a nominal working range of the battery pack(s); the control unit being adapted to disconnect at least one battery pack from the remaining, connected and active, battery pack(s); and to set the allowed operating extent of the remaining battery pack(s) to an increased working range so as to enable the energy storage system to provide the nominal power functionality to the vehicle, characterised by the control unit being adapted to monitor at least one accumulated parameter indicative of the operation of the energy storage system from the time of disconnection of the at least one battery pack, and, when the accumulated parameter reaches a threshold value, setting the allowed operating extent for the remaining battery pack(s) to a decreased working range.

Optionally, the control unit may be adapted to monitor at least a first and a second accumulated parameter, and to, when the first accumulated parameter reaches a first threshold value, or when the second accumulated parameter reaches a second threshold value, set the allowed operating extent for the remaining battery pack(s) to the decreased operating range.

Optionally, the first and/or second accumulated parameter are/is indicative of the time passed after disconnection of the at least one battery pack from the energy storage system, the electrical work performed by the energy storage system after disconnection of the at least one battery pack, and/or the energy throughput of the energy storage system ( after disconnection of the at least one battery pack.

Optionally, the control unit may be adapted to perform any of the steps as described in the above in relation to the method for controlling the operation of an energy storage system, and/or provided with means having features for accomplishing such steps.

In a fifth aspect, the object is achieved by a vehicle in accordance to appended claim 15, comprising a control unit as described in the above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
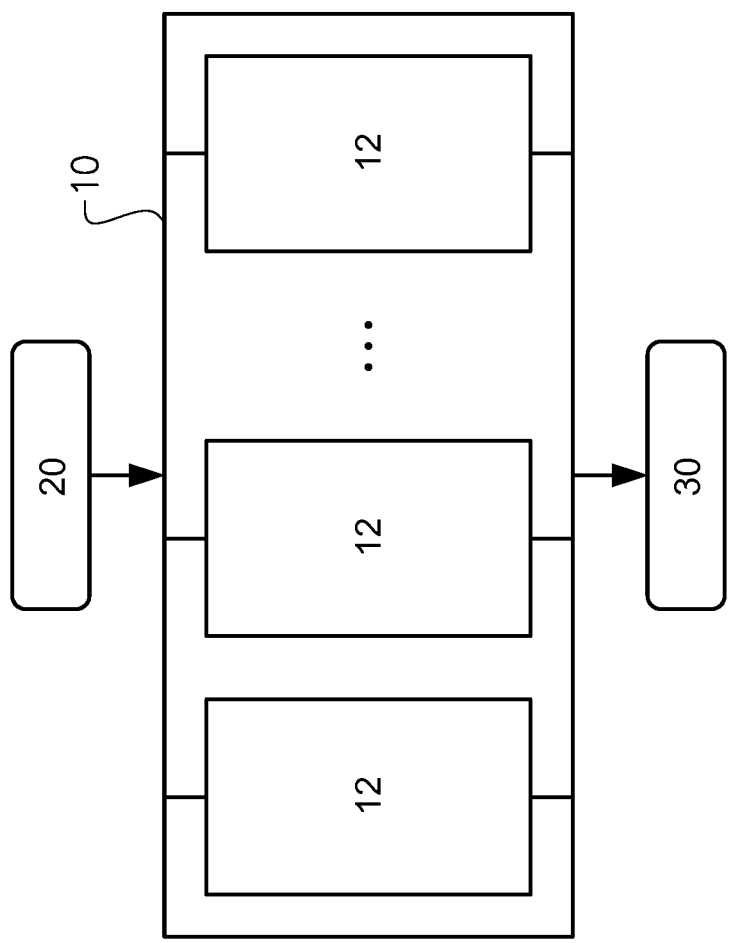
FIG. 1 is a schematic drawing of an embodiment of an energy storage system connected to a vehicle.

FIG. 1 schematically illustrates an embodiment of an energy storage system 10, comprising a plurality of battery packs 12.

The battery packs 12 are connected in parallel in the energy storage system 10. Each battery pack 12 is arranged to be disconnectable from the other battery packs 12. Accordingly, if desired, a battery pack 12 may be disconnected and the energy storage system 10 may continue its operation using the remaining, interconnected battery packs 12.

A control unit 20 is arranged to control operation of the battery packs 12. Moreover, the battery packs 12 are connected so as to provide power for propulsion of a vehicle 30.

Although the control unit 20 is preferably to be arranged on-board the vehicle 30, the control unit 20 may alternatively be a remote unit with which the energy storage system 10 is arranged to communicate e.g. via a wireless connection such as via an internet connection.

The energy storage system is adapted to provide at least a nominal power functionality for propulsion of the vehicle 30 using a nominal working range of the battery packs 12.

The nominal power functionality of the vehicle may be determined as a required functionality to ensure an intended use of the vehicle. To this end, it is necessary that the battery packs are able to provide sufficient electrical work output and/or energy throughput for a sufficient duration.

To establish a nominal power functionality of a vehicle, a set or sets of function parameters such as the above mentioned electrical work output, energy throughput and/or duration may be established, where the nominal power functionality is said to be ensured if all such sets may be provided by the energy storage system.

The sets of function parameters may be determined by studying specific use situations of the vehicle. For example a set of function parameters may be determined by considering what is necessary in order to enable continued propagation of the vehicle at a certain speed when loaded with a specific load, and/or to enable a desired acceleration, and/or to enable e.g. propagation uphill a steep slope at a minimum speed.

For a vehicle for which the intended use is not known, the use situations selected in order to determine the nominal working range may be made based on assumptions of normal use of such a vehicle and/or general vehicle requirements.

For a vehicle for which the intended use is known (e.g. a bus on a specific tour, a taxi in a specific neighbourhood, etc.) it may be conceivable to select specific use situations for the individual vehicle, and to adapt the set of function parameters accordingly. For example, some working vehicles, such as a bus serving a specific bus tour or a truck performing regular loading and discharging activities, may be determined to follow a very specific work schedule. In this case, the sets of function parameters may be determined from situations occurring along the vehicle's individual work schedule, and the nominal power functionality of the vehicle may hence be determined so as to relatively accurately reflect a power functionality required to fulfil the working schedule of the vehicle.

The nominal power functionality should be achievable from the energy storage system 10 using only a nominal working range of the battery packs 12. The nominal working range of the battery packs 12 may be set considering the optimum working conditions of the battery packs in order to achieve an expected lifetime thereof.

The nominal working range may be expressed e.g. in an allowable state of charge (SOC). A typical nominal allowed working range may for example be 40 to 60%. Accordingly, excessive loading and depletion of the battery packs are avoided, which is generally beneficial for the long term function of the battery packs.

Alternatively, the nominal working range may be set in terms of e.g. maximum discharge current or discharge power.

Upon disconnection of at least one battery pack 12, the allowed operating extent for the remaining and connected battery packs 12 is to be increased from the nominal working range to an increased working range so as to enable the energy storage system 10 to continue providing the nominal power functionality to the vehicle.

Accordingly, by setting the allowed operating extent to the increased working range, the remaining battery packs 12 of the energy system is allowed to work also outside of the nominal working range. For example, if the nominal working range is measured in State of Charge, a nominal working range may be 40 to 60%, whereas an increased working range may be 30 to 70%.

Alternatively, the working ranges may be set in different terms, such as in terms of power output of the energy storage system, discharge current etc.

The increased working range may be selected so as to enable continued provision of the nominal power functionality to the vehicle, i.e. the vehicle may perform "as usual".

However, the remaining battery packs are at risk of becoming impaired if working within such an increased working range, at least if the over-use of the battery packs takes place during a considerable period of time.

Accordingly, the interval during which the energy system is allowed to provide the increased working range should be restricted.

To this end, at least one accumulated parameter indicative of the operation of the energy storage system 10 is to be monitored from the time of disconnection of the battery pack 12 from the remaining, active and functioning, battery packs 12.

When the accumulated parameter reaches a threshold value, the allowed operating extent of the remaining battery packs is to be set to a decreased working range. With "decreased working range" is meant that the possible power output is decreased in relation to the previous increased working range, and not necessarily in relation to the nominal working range. However, it may be preferred that the decreased working range is equal to the nominal working range, or that it may be narrower than the nominal working range.

With the decreased working range and using the remaining battery packs 12 only, it will generally no longer be possible for the energy storage system 10 to provide the nominal power functionality for propulsion of the vehicle 30.

However, as is understood from the above, the method results in an interval between the time of disconnection of the battery pack 12 and the setting of the decreased working range, during which interval the increased working range ensures that the nominal power functionality may still be achieved.

This interval may suitably be adapted e.g. to drive the vehicle to a service station for replacement of the faulty battery 12.

Alternatively, the time period may be adapted to complete a work schedule of the vehicle. In particular, for a vehicle having an intended use involving a predetermined work schedule, the threshold of the accumulated parameter may be set taking the predetermined work schedule into account.

For example, the threshold may be set so as to enable a bus to finish its intended route, or to finish a working day, with continued provision of the nominal power functionality, that is, without any impaired function of the vehicle.

Accordingly, when setting the threshold value for the accumulated parameter, the interest of keeping the batteries in a good condition may be balanced with the need for acquiring a certain interval during which the nominal power functionality for propulsion of the vehicle may still be achieved.

The interval may be at least 4 h, preferably at least 8 h, more preferred at least 10 h. Such a time period may also be less than 36 h, preferably less than 24 h, most preferred less than 15 h.

Once the allowed operating extent of the remaining battery packs 12 is set to the decreased working range, the vehicle 30 may no longer be provided with the nominal power functionality. Still, some power functionality may be provided to the vehicle 30, for example enabling driving at relatively slow speed.

In particular, it is intended that a scheduled interval enabling the completion of a work schedule may be accomplished. To this end, the threshold for the accumulated parameter may be established taking the work schedule of the vehicle into account.

Accordingly, it may be ensured e.g. that a bus may complete its intended route before requiring service.

In practice, when setting the threshold value, it may be considered what is necessary in order to maintain the nominal power functionality for the desired interval.

Figure 2:
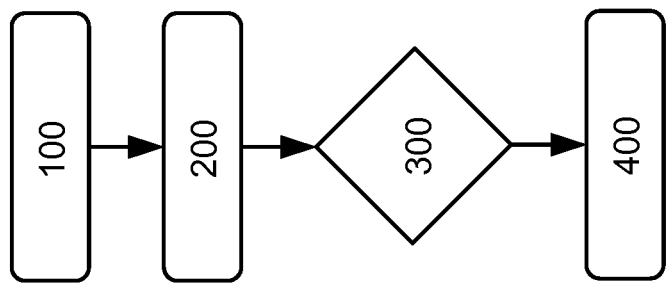
FIG. 2 is a schematic flow chart of a method for controlling an energy storage system.

With reference to FIG. 2, the method described in the above may be presented as a number of steps including:
- disconnecting at least one battery pack 100,
- setting the allowed operating extent for the remaining connected and active battery pack(s) to an increased working range so as to enable the energy storage system to provide the nominal power functionality to the vehicle 200,
- monitoring at least one accumulated parameter indicative of the operation of the energy storage system from the time of disconnection of the at least one battery pack 300, and
- when the accumulated parameter reaches a threshold value,
- setting the allowed operating extent for the remaining battery pack(s) to a decreased working range 400.

It will be understood that additional steps may be added to the method. For example, prior to disconnecting the at least one battery pack 100, a step of determining whether a battery pack shall be disconnected may be performed.

Also, the step of monitoring at least one accumulated parameter may be modified so as to include monitoring at least two different accumulated parameters, each having a different threshold value. The method may continue to setting the decreased working range 400 if at least one out of the two accumulated parameters reaches its corresponding threshold value.

The energy storage system 10 with its battery packs 12 may be designed in numerous manners to accomplish the necessary control thereof and the transmittal of the stored energy of the battery packs 12 to the propulsion system of the vehicle 30.

Figure 3:
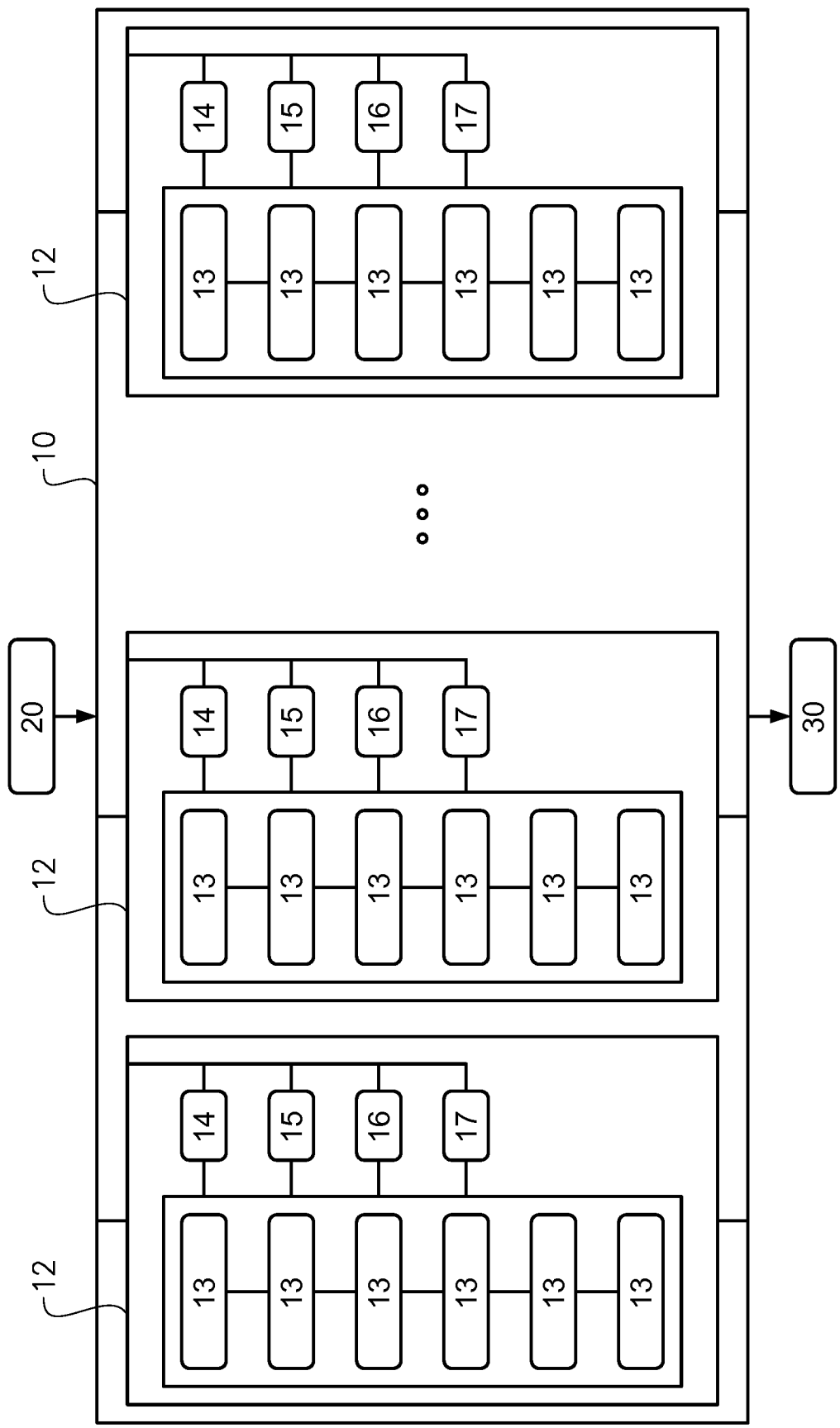
FIG. 3 is a more detailed schematic drawing of an embodiment of an energy storage system connected to a vehicle.
Figure 4A:
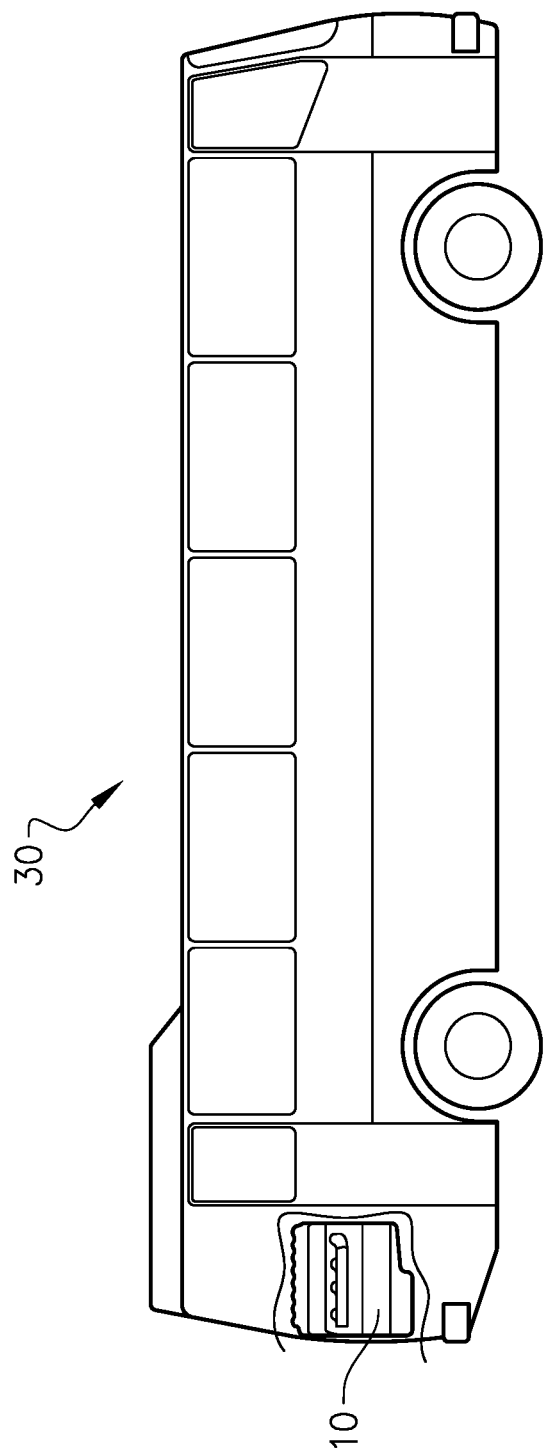
FIGS. 4A and 4B illustrate embodiments of vehicles comprising an energy storage system.
Figure 4B:
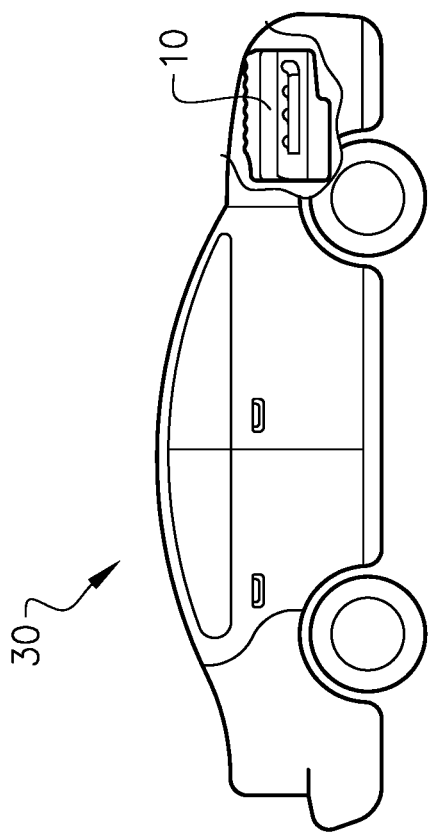

FIG. 3 illustrates an example embodiment of such an energy storage system 10.

The battery packs 12 may comprise any kind of electricity storing device 13 capable of storing and discharging electricity, such as a lithium ion cell, a nickel-hydrogen cell, a lead accumulator, or an electric double layer capacitor. The number of electricity storing devices 13 in a battery pack 12 may be in the range of hundreds to thousands.

Typically, each battery pack 12 may comprise a module comprising a plurality of individual electricity storing devices 13.

The energy storage system 10 may advantageously comprise measuring means 17 for measuring properties of the battery packs 12, and/or disconnection means 15 for enabling disconnection of a battery pack 12 from the remainder of the battery packs 12.

Measuring means 17 and/or disconnection means 15 may be arranged in connection to each battery pack 12, such that each battery pack 12 comprises electricity storing devices 13 and corresponding measuring means 17 and disconnection means 15, as illustrated in FIG. 1.

Alternatively, measuring means 17 and/or disconnection means 15 could be arranged separate from the battery packs 12.

The measuring means 15 may be arranged to measure any property of the battery pack 12, e.g. the discharge current and/or the voltage of the battery pack 12 and/or the temperature thereof.

On the basis of the measurements performed by the measuring means 17, a state of the battery pack 12 may be determined. For example, the state of charge (SOC), state of health (SOH), as well as abnormalities in the battery pack 12 may be detected.

Advantageously, the control unit 20 may perform the determination of the state of the battery packs 12, and/or a determination that a battery pack 12 is to be disconnected. To this end, the control unit 20 may transmit and receive control signals from and to the various components 13, 14, 15, 16, 17 of the battery packs 12.

Optionally, the determination of the state of the battery packs 12 may take place e.g. in sub-control units 14 arranged in connection with each individual battery pack 12.

Typically, the determination of the state of the battery packs 12 may be performed in order to determine whether a battery pack 12 is faulty or not.

Generally, a determination that a battery pack 12 is faulty may be made using any known method for detecting errors in battery packs 12, for which any necessary measurement equipment may be provided.

If the battery pack 12 is determined to be faulty, it will be disconnected from the remaining battery packs 12.

A fault in a battery pack 12 may be permanent, i.e. requiring replacement of the battery pack 12 by a new battery pack. Such a fault may for example be a fault in the electronics of the battery pack 12, a fault in an energy storage device 13, a fault in a sensor device in the battery pack.

Alternatively, a fault in a battery pack 12 may be temporary, e.g. it may be determined that the temperature in or surrounding a specific battery pack 12 is such that the functioning of the battery pack 12 is impaired, but that the battery pack 12 will recover as soon as a more suitable temperature is established.

If a battery pack 12 is determined to be faulty, the battery pack will be disconnected from the remaining battery packs 12, preferably using the disconnection means 15.

It is to be understood that the present invention is not limited to the embodiments described above and illustrated in the drawings; rather, the skilled person will recognize that many changes and modifications may be made within the scope of the appended claims.

For example, the battery packs 12 may be arranged in various manners, and may comprise various means serving different purposes in the energy storage system, such as climatisation means for controlling the temperature of the energy storage devices 13. To this end, a cooling system may advantageously be arranged in communication with the battery packs 12.

The invention claimed is:

1. A method for controlling an operation of an energy storage system in a vehicle, preferably an electric or hybrid electric vehicle, said energy storage system comprising at least two battery packs connected in parallel, said energy storage system being adapted to provide at least a nominal power functionality for propulsion of said vehicle using an allowed operating extent of all of said battery packs of said energy storage system, said allowed operating extent being a nominal working range of said battery packs; said method comprising disconnecting at least one battery pack; and setting said allowed operating extent for said remaining connected and active battery pack(s) to an increased working range so as to enable said energy storage system to provide said nominal power functionality to said vehicle, characterised by monitoring at least one accumulated parameter indicative of the operation of said energy storage system from the time of disconnection of said at least one battery pack, and when said accumulated parameter reaches a threshold value, setting said allowed operating extent for said remaining battery pack(s) to a decreased working range, wherein said allowed operating extent is expressed in terms indicative of at least one of a state of charge, a charging current, a discharging current, and a power output of said battery pack(s).

2. The method according to claim 1, comprising monitoring at least a first and a second accumulated parameter indicative of said operation of said energy storage system, and, when said first accumulated parameter reaches a first threshold value, or said second accumulated parameter reaches a second threshold value, setting said allowed operating extent of said remaining battery packs to said decreased working range.

3. The method according to claim 1, wherein said accumulated parameter is indicative of the time passed after disconnection of said at least one battery pack, an electrical work performed by said energy storage system after disconnection of said at least one battery pack and/or an energy throughput of said energy storage system after disconnection of said at least one battery pack.

4. The method according to claim 1, wherein said accumulated parameter is indicative of an energy throughput of said energy storage system after disconnection of said at least one battery pack, and said threshold value is greater than 200 kWh and said threshold value is less than 10 000 kWh.

5. The method according to claim 1, comprising, when said threshold value is reached, setting said allowed operating extent of said remaining battery pack(s) to said decreased working range being such that provision of said nominal power functionality from said energy storage unit to said vehicle is disabled.

6. The method according to claim 1, wherein said nominal power functionality corresponds to a set or sets of function parameters to be provided by said energy storage system, said function parameters comprising electrical work output and/or energy throughput, and/or duration.

7. The method according to claim 1, wherein said threshold value is adapted to enable the completion of an intended use schedule of said vehicle requiring the provision of an intended power functionality from said energy storage system to said vehicle for a scheduled interval.

8. The method according to claim 7, wherein said scheduled interval is at least 4 h and less than 36 h.

9. The method according to claim 1, comprising determining that said at least one battery pack is faulty before disconnecting said battery pack from said remaining battery pack(s).

10. A non-transitory computer readable medium carrying a program comprising program code means for performing the steps of claim 1 when said program is run on a computer.

11. A non-transitory computer readable medium carrying a computer program comprising program code means for performing the steps of claim 1 when said program product is run on a computer.

12. A control unit for controlling an operation of an energy storage system in a vehicle, preferably an electric or hybrid electric vehicle, said energy storage system comprising at least two battery packs connected in parallel, said energy storage system being adapted to provide at least a nominal power functionality for propulsion of said vehicle using an allowed operating extent of all of said battery packs of said energy storage system said allowed operating extent being a nominal working range of said battery pack(s); said control unit being adapted to disconnect at least one battery pack from said remaining, connected and active, battery pack(s);

and to set said allowed operating extent of said remaining battery pack(s) to an increased working range so as to enable said energy storage system to provide said nominal power functionality to said vehicle characterised by said control unit being adapted to monitor at least one accumulated parameter indicative of the operation of said energy storage system from the time of disconnection of said at least one battery pack, and, when said accumulated parameter reaches a threshold value, setting said allowed operating extent for said remaining battery pack(s) to a decreased working range,
   wherein said allowed operating extent is expressed in terms indicative of at least one of a state of charge, a charging current, a discharging current, and a power output of said battery pack(s).

13. The control unit according to claim 12, being adapted to monitor at least a first and a second accumulated parameter, and to, when said first accumulated parameter reaches a first threshold value, or when said second accumulated parameter reaches a second threshold value, set said allowed operating extent for said remaining battery pack(s) to said decreased working range.

14. The control unit according to claim 12, wherein said first and/or second accumulated parameter are/is indicative of the time passed after disconnection of said at least one battery pack from said energy storage system, the electrical work performed by said energy storage system after disconnection of said at least one battery pack, and/or an energy throughput of the energy storage system after disconnection of said at least one battery pack.

15. A vehicle comprising the control unit according to claim 12.

* * * * *